(12) United States Patent
Hagerott et al.

(10) Patent No.: US 8,332,505 B2
(45) Date of Patent: Dec. 11, 2012

(54) METHOD TO AUTOMATICALLY DETERMINE HOST TO LUN (LOGICAL UNIT NUMBER) PATH AVAILABILITY FOR MULTI PATH ATTACHED STORAGE SYSTEMS

(75) Inventors: Steven G. Hagerott, Wichita, KS (US); Robert R. Stankey, Jr., Wichita, KS (US); Glenn Tefft, Longmont, CO (US); Mark Ziegler, Andover, KS (US)

(73) Assignee: LSI Corporation, Milpitas, CA (US)

( * ) Notice: Subject to any disclaimer, the term of this patent is extended or adjusted under 35 U.S.C. 154(b) by 821 days.

(21) Appl. No.: 12/074,509

(22) Filed: Mar. 4, 2008

(65) Prior Publication Data

US 2009/0228748 A1    Sep. 10, 2009

(51) Int. Cl.
*G06F 15/173* (2006.01)
*G06F 11/00* (2006.01)
*G11C 29/00* (2006.01)
*G01R 35/00* (2006.01)

(52) U.S. Cl. .......... 709/224; 714/718; 714/41; 702/108
(58) Field of Classification Search .............. 709/224
See application file for complete search history.

(56) References Cited

U.S. PATENT DOCUMENTS

| 6,457,098 B1* | 9/2002 | DeKoning et al. ............ 711/114 |
| 7,275,103 B1* | 9/2007 | Thrasher et al. .............. 709/224 |
| 2003/0172321 A1* | 9/2003 | Wolin et al. ..................... 714/41 |
| 2006/0242363 A1* | 10/2006 | Tamura et al. ............... 711/117 |

* cited by examiner

*Primary Examiner* — Brian P Whipple
*Assistant Examiner* — Herman Belcher
(74) *Attorney, Agent, or Firm* — Suiter Swantz pc llo

(57) ABSTRACT

The present disclosure provides testing of a storage system. The test may compare the storage array controller LUNs which may be configured to be accessible by a host with the LUNs which are currently available to prevent a zero path scenario from occurring. The test may verify at least one path exists for each LUN to a storage controller of a storage array before injecting an error into another storage controller of the storage array. The present disclosure also provides verification of the configuration of a storage system. The configuration verification may verify that the storage array controller LUNs which are configured to be accessible by a host are actually accessible by the host. If the configuration verification is unable to verify the configuration of storage system, the configuration verification may display an error.

10 Claims, 10 Drawing Sheets

METHOD TO AUTOMATICALLY DETERMINE HOST TO LUN (LOGICAL UNIT NUMBER) PATH AVAILABILITY FOR MULTI PATH ATTACHED STORAGE SYSTEMS

FIELD OF THE INVENTION

This invention relates generally to storage systems, and particularly to path availability for storage systems.

BACKGROUND OF THE INVENTION

Storage systems provide data storage for computer systems. Attached storage systems allow storage devices to be attached to computer systems for use. Direct-attached storage (DAS) refers to a storage system directly attached to a computer system without a storage network in between. Network-attached storage (NAS) is a file-level computer data storage connected to a computer network providing data access to heterogeneous network clients of a computer system. A storage area network (SAN) is an architecture to attach remote computer storage devices (such as disk arrays, tape libraries, and optical jukeboxes) to servers so as to appear locally attached to the computer system.

SUMMARY OF THE INVENTION

Accordingly, the present disclosure provides testing of a storage system that may prevent a zero path scenario from occurring. The storage array controller LUNs which may be configured to be accessible by a host may be automatically discovered. A failover driver of a host may be queried one or more times during testing to determine which LUNs are currently available to the host with storage controllers of a storage array. The test may compare the storage array controller LUNs which may be configured to be accessible by the host with the LUNs which are currently available to the host as associated with storage controllers of a storage array to prevent a zero path scenario from occurring.

The test may verify at least one path exists for each LUN to a storage controller of a storage array before injecting an error into another storage controller of the storage array. The test may pause to prevent a zero path scenario from occurring by locking alternate storage controllers of a storage array when an error is injected to a storage controller of the storage array. The test may then unlock the locked controller once the test has verified that a zero path condition will not occur. The test may lock or unlock storage controllers utilizing a semaphore mechanism associated with the respective controller.

The test may also track and record the time it takes for the enumeration process to complete when a path is restored. This time may be utilized to optimize the enumeration process handling software.

The present disclosure also provides verification of the configuration of a storage system. The configuration verification may verify that the storage array controller LUNs which are configured to be accessible by a host are actually accessible by the host. The storage array controller LUNs which are configured to be accessible by a host may be automatically discovered. A failover driver of a host may be queried one or more times during testing to determine which LUNs are currently accessible by the host as associated with storage controllers of a storage array. The configuration verification may compare the storage array controller LUNs which are configured to be accessible by a host with the LUNs which are currently accessible by the host as associated with storage controllers of a storage array to verify the configuration of the storage system. If the configuration verification is unable to verify the configuration of storage system, the configuration verification may display an error.

It is to be understood that both the foregoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiments of the invention, examples of which are illustrated in the accompanying drawings.

Computer systems may interact with storage arrays of attached storage systems via storage array controllers. The storage array controllers may present the storage of the storage arrays as virtual partition (or volume). A LUN (logical unit number) is the address of a virtual partition (or volume) of the storage of the storage array, and by extension the virtual partition itself. Storage arrays may have one or more redundant controllers to provide multiple paths between the host (computer system) and the LUN(s) of the storage array. In this way, a storage controller of a storage array may fail and the LUNs of the storage array are still accessible by the host.

Storage systems, storage arrays, and storage controllers may be tested to verify failure handling. Test sequences may include scripts run to simulate failure conditions by injecting faults (including, but not limited to, cable insertion, removal, storage controller failovers, and/or storage controller reboots) to storage controllers. Behaviors of storage systems, storage arrays, and storage controllers resulting from such testing may be observed, recorded, and/or analyzed to determine whether failure conditions were handled appropriately.

Many operating systems, particularly operating systems that utilize hot plug (the ability to add or remove components of a computer while it is operating) or plug and play (a feature that allows the addition of a new device to a computer without requiring reconfiguration or manual installation of device drivers), (including, but not limited to, Windows Vista and SUS Linux 10) may implement functionality where resources relating to devices (including, but not limited to, mice, keyboards, and disk drives) may be dynamically allocated and released as those devices are attached or removed from the host system. The specific details of how an operating system determines these configuration changes vary depending on platform and device. However, generally operating systems may make various requests to a device that is attached to obtain necessary information and one or more kernel/user-mode processes may be involved. The process of dynamically allocating resources to a device and preparing the device for use is referred to as the enumeration process.

Figure 1:
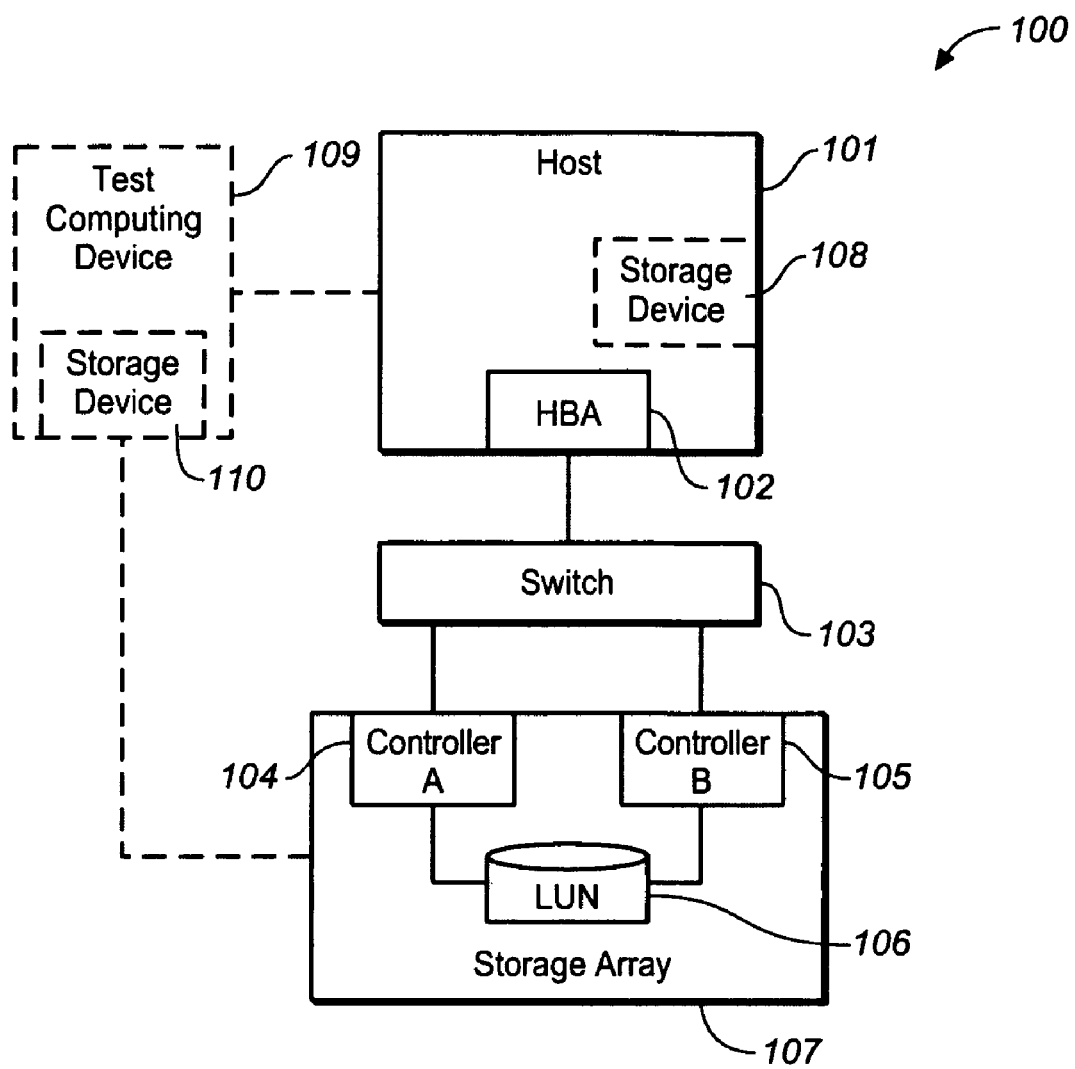
FIG. 1 is block diagram of a storage system, in accordance with an exemplary embodiment of the present invention.

FIG. 1 illustrates an example of a storage system 100. Storage system 100 may include a host 101 and a storage array 107 communicably coupled via a switch 103. Storage system 100 may comprise any kind of attached storage including, but not limited to, DAS, NAS, or SAN. Although host 101 and storage array 107 are depicted as communicably connected via switch 103, host 101 and storage array 107 may be communicably connected via a mechanism other than switch 103 without departing from the scope of the present disclosure. Host 101 may include a host bus adapter (HBA). A HBA connects a host system to other network and storage devices. Storage array 107 may include a storage controller A 104, a storage controller B 105, and a volume 106 associated with a LUN. Although storage system 100 is depicted with one host 101, one switch 103, and one storage array 107, storage system 100 may include any number of hosts 101 (including, but not limited to, five or one hundred), any number of switches 103 (including, but not limited to, three or thirty), and/or any number of storage arrays 107 (including, but not limited to, three or fifty) without departing from the scope of the present disclosure. Although host 101 is depicted as including one HBA 102, host 101 may include any number of HBAs (including, but not limited to, two or forty) without departing from the scope of the present disclosure. Although storage array 107 is depicted with two storage controllers 104 and 105 and one volume 106, storage array 107 may include any number of storage controllers 104 and 105 (including, but not limited to, six or seventeen) and/or any number of volumes (including, but not limited to, seven or eighty) without departing from the scope of the present disclosure.

Timing issues may arise during testing of storage system 100, storage array 107, storage controller A 104, and/or storage controller B 105 when the enumeration process exceeds the amount of time a test script is given to perform a test step before continuing to the next step. For example, a storage controller failover test may take storage controller A 104 offline for ten minutes, wait for ten minutes, and then bring storage controller A 104 back online. Ten minutes later, storage controller B 105 may be taken offline for ten minutes and then brought online again. This process may then repeat with storage controller A 104. If the enumeration process has not completed for storage controller A 104 before storage controller B 105 is taken offline, a zero path scenario (where there are no paths available between a LUN and the associated storage array) may result. In such a case, there may be no path available from host 101 to volume 106. This is a faulty scenario to inject during a test and causes false test failures. This sort of false test failure results in lost test time and engineering resources used to debug a problem whose root cause is a faulty test scenario.

Testing of storage system 100, storage array 107, storage controller A 104, and/or storage controller B 105 may prevent a zero path scenario from occurring. The storage array controller LUNs which may be configured to be accessible by host 101 may be automatically discovered. World Wide Names (WWN) (a unique identifier on a storage network) may be used between HBA 102, the LUN mapping to volume 106, storage array controller A 104, and storage array controller 105 as the unique identifier to discover this relationship by querying mapping data structures of storage array 107 and HBA 102 of host 101. A failover driver of host 101 may be queried one or more times during testing to determine which LUNs are currently available to host 101 as associated with storage controller A 104 and/or storage controller B 105. The test may compare the storage array controller LUNs which may be configured to be accessible by host 101 with the LUNs which are currently available to host 101 as associated with storage controller A 104 and/or storage controller 105 to prevent a zero path scenario from occurring between host 101 and storage array 107. The test may verify at least one path exists for each LUN to storage controller A 104 before injecting an error into storage controller B 105 or may verify at least one path exists for each LUN to storage controller B 105 before injecting an error into storage controller A 104. The test may pause to prevent a zero path scenario from occurring between host 101 and storage array 107. In order to pause, the test may lock storage controller A 104 when an error is injected to storage controller B 105 or may lock storage controller B 105 when an error is injected to storage controller A 104. Locking storage controller A 104 and/or storage controller B 105 may not affect the operation of storage controller A 104 and/or storage controller B 105, but rather may prevent an error from being injected while locked. Locking storage controller A 104 and/or storage controller B 105 may occur outside the knowledge and operation of storage array 107. The test may then unlock the locked controller once the test has verified that a zero path condition will not occur. The test may lock or unlock storage controller A 104 and/or storage controller B 105 utilizing a semaphore mechanism associated with the respective controller. The semaphore mechanism may include, but is not limited to, a software data structure and/or the presence or absence of a file.

The test may also track and record the time it takes for the enumeration process to complete when a path between host 101 and storage array 107 is restored. This time may be utilized to optimize the enumeration process handling software.

A set of storage array controller LUNs which may be configured to be accessible by host 101 may be automatically generated by determining the WWN of storage array 107, determining the WWNs of the LUNs owned by storage array 107, determining the WWNs of HBA 102 of host 101 that the LUNs are mapped to, and by determining host 101 network address (including but not limited to internet protocol address (or IP) or DNS (domain name service) name) to HBA 102 WWN. The WWN of storage array 107 may be determined by querying storage array 107 via the network RPC (remote procedure call) API (application programming interface) of storage array 107. Alternatively, the test may provide a list of the WWN of storage array 107 associated with the network addresses (including, but not limited to IP addresses) of storage controller A 104 and storage controller B 105. This may yield relationships of storage arrays ←→storage controller network addresses ←→ storage controller WWNs. The WWNs of the LUNs owned by storage array 107 may be determined by querying storage array 107 via the network RPC API of storage array 107. This may yield relationships of storage controller WWNs ←∴ LUN WWNs. The WWNs of HBA 102 of host 101 that the LUNs are mapped to may be determined by querying storage array 107 via the network RPC API of storage array 107. This may yield relationships of LUN WWNs ←→ HBA WWNs. The host 101 network address to HBA 102 WWN may be determined querying host 101 for the WWN of HBA 102. Host 101 may be queried for the WWN of HBA 102 utilizing a HBA API of HBA 102. Alternatively the host 101 network address to HBA 102 WWN may be determined from input to the test. By determining the WWN of storage array 107, determining the WWNs of the LUNs owned by storage array 107, determining the WWNs of HBA 102 of host 101 that the LUNs are mapped to, and by determining host 101 network address to HBA 102 WWN, a set storage array controller LUNs which may be configured to be accessible by host 101 may be automatically generated.

A set of LUNs which are currently available to host 101 as associated with storage controller A 104 and/or storage controller B 105 may be generated by querying a failover driver of host 101. The failover driver of host 101 is a driver which handles the failure of a path to a LUN by providing access to the LUN over an alternate path when a first path to a LUN fails. The failover driver of host 101 may store information relating to the LUNs which are currently available to host 101 as associated with storage controller A 104 and/or storage controller B 105.

Figure 2:
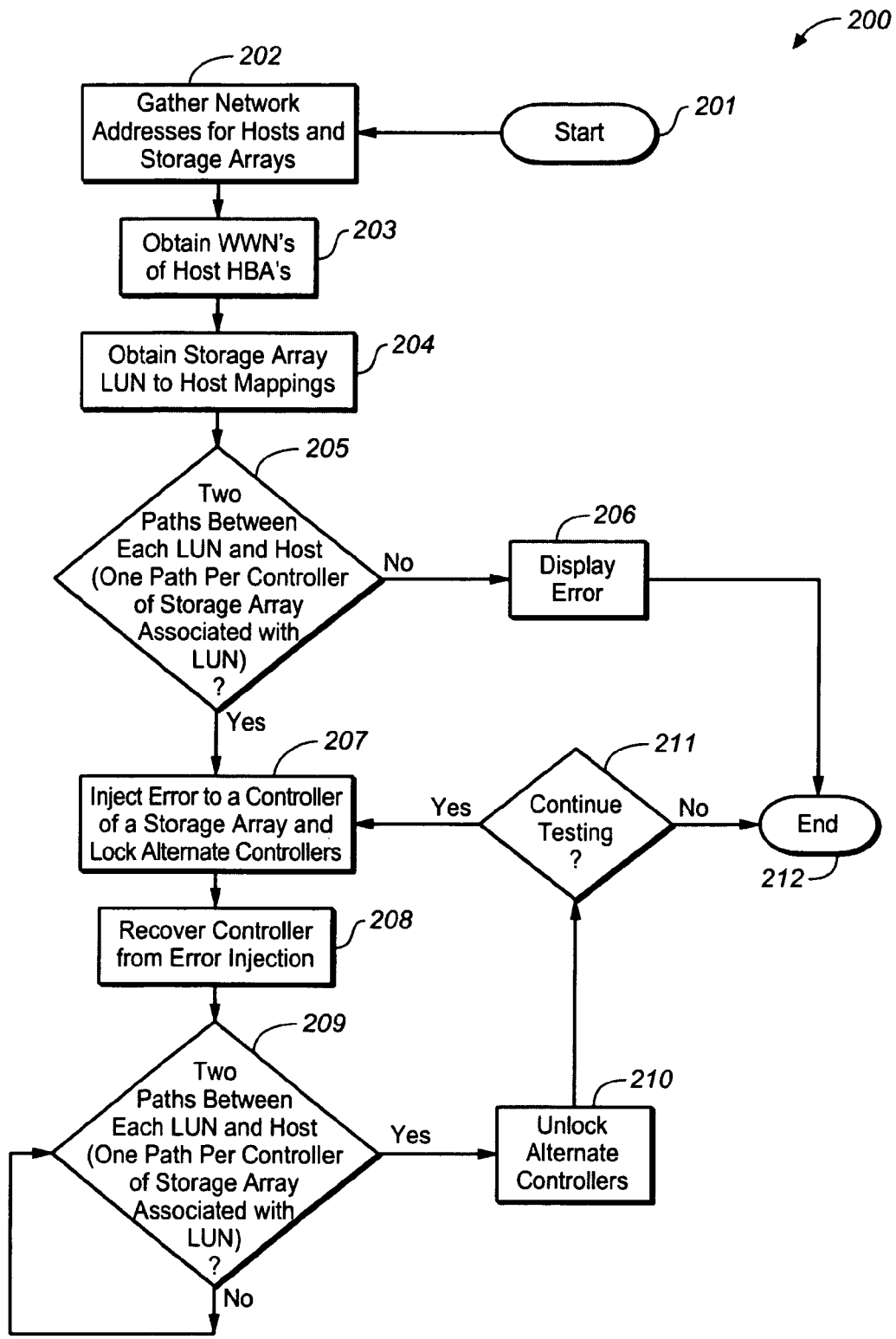
FIG. 2 is a flowchart of a test method, in accordance with an exemplary embodiment of the present invention.

FIG. 2 illustrates a flowchart of a test method 200, in accordance with an exemplary embodiment of the present disclosure, which may be utilized with a storage system such as storage system 100. From a start 201, network addresses for hosts and storage arrays are gathered 202. WWNs of host HBAs are obtained 203. Storage array LUN to host mappings are obtained 204. A determination 205 is made as to whether 2 paths exist between each LUN and host (at least one path per controller of the storage array associated with each LUN). If 2 paths do not exist between each LUN and host (at least one path per controller of the storage array associated with each LUN), an error is displayed 206 and the test proceeds to an end 212. The error may be displayed on an output device (including, but not limited to a CRT, a LCD, and a printer) (not shown) and/or recorded in storage device (including, but not limited to, a main memory, a cache memory, a hard disk, and a flash memory). If 2 paths exist between each LUN and host (at least one path per controller of the storage array associated with each LUN), an error is injected to a controller of a storage array and alternate controllers of the storage array are locked 207. Locking the controller of the storage array may not affect the operation of the controller, but rather may prevent an error from being injected while locked. Locking of the controller may occur outside the knowledge and operation of the storage array. Then, the controller is recovered from the injected error 208. A determination 209 is made as to whether 2 paths exist between each LUN and host (at least one path per controller of the storage array associated with each LUN). If 2 paths do not exist between each LUN and host (at least one path per controller of the storage array associated with each LUN), a determination 209 is again made as to whether 2 paths exist between each LUN and host (at least one path per controller of the storage array associated with each LUN). If 2 paths exist between each LUN and host (at least one path per controller of the storage array associated with each LUN), the alternate controllers of the storage array are unlocked 210. A determination 211 is made as to whether to continue testing. If testing is to continue, an error is injected to a controller of a storage array and alternate controllers of the storage array are locked 207. Locking the controller of the storage array may not affect the operation of the controller, but rather may prevent an error from being injected while locked. Locking of the controller may occur outside the knowledge and operation of the storage array. If testing is not to continue, the test proceeds to an end 212.

Figure 3:
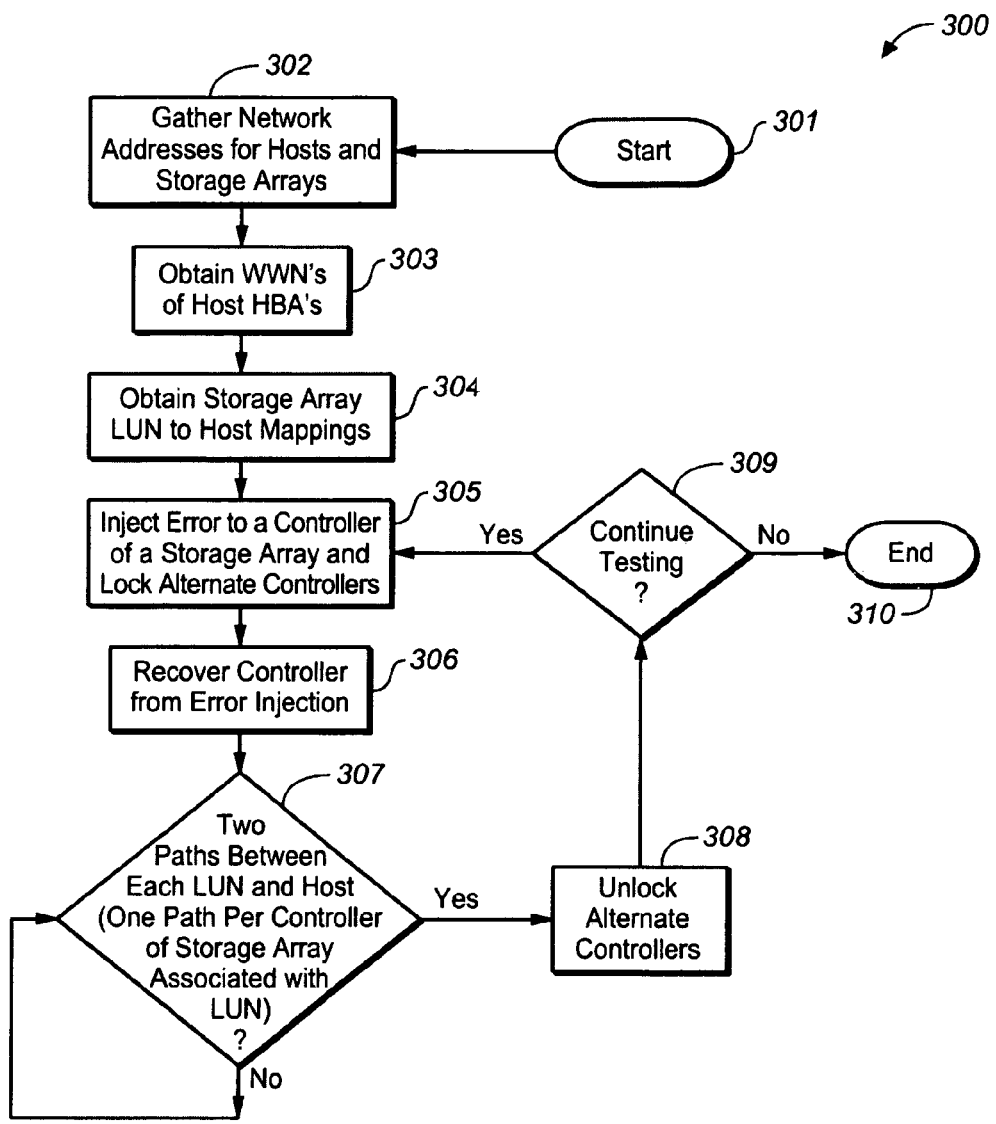
FIG. 3 is a flowchart of a test method, in accordance with an alternative embodiment of the present invention.

FIG. 3 illustrates a flowchart of a test method 300, in accordance with an alternative embodiment of the present disclosure, which may be utilized with a storage system such as storage system 100. From a start 301, network addresses for hosts and storage arrays are gathered 302. WWNs of host HBAs are obtained 303. Storage array LUN to host mappings are obtained 304. An error is injected to a controller of a storage array and alternate controllers of the storage array are locked 305. Locking the controller of the storage array may not affect the operation of the controller, but rather may prevent an error from being injected while locked. Locking of the controller may occur outside the knowledge and operation of the storage array. Then, the controller is recovered from the injected error 306. A determination 307 is made as to whether 2 paths exist between each LUN and host (at least one path per controller of the storage array associated with each LUN). If 2 paths do not exist between each LUN and host (at least one path per controller of the storage array associated with each LUN), a determination 307 is again made as to whether 2 paths exist between each LUN and host (at least one path per controller of the storage array associated with each LUN). If 2 paths exist between each LUN and host (at least one path per controller of the storage array associated with each LUN), the alternate controllers of the storage array are unlocked 308. A determination 309 is made as to whether to continue testing. If testing is to continue, an error is injected to a controller of a storage array and alternate controllers of the storage array are locked 305. Locking the controller of the storage array may not affect the operation of the controller, but rather may prevent an error from being injected while locked. Locking of the controller may occur outside the knowledge and operation of the storage array. If testing is not to continue, the test proceeds to an end 310.

Figure 4:
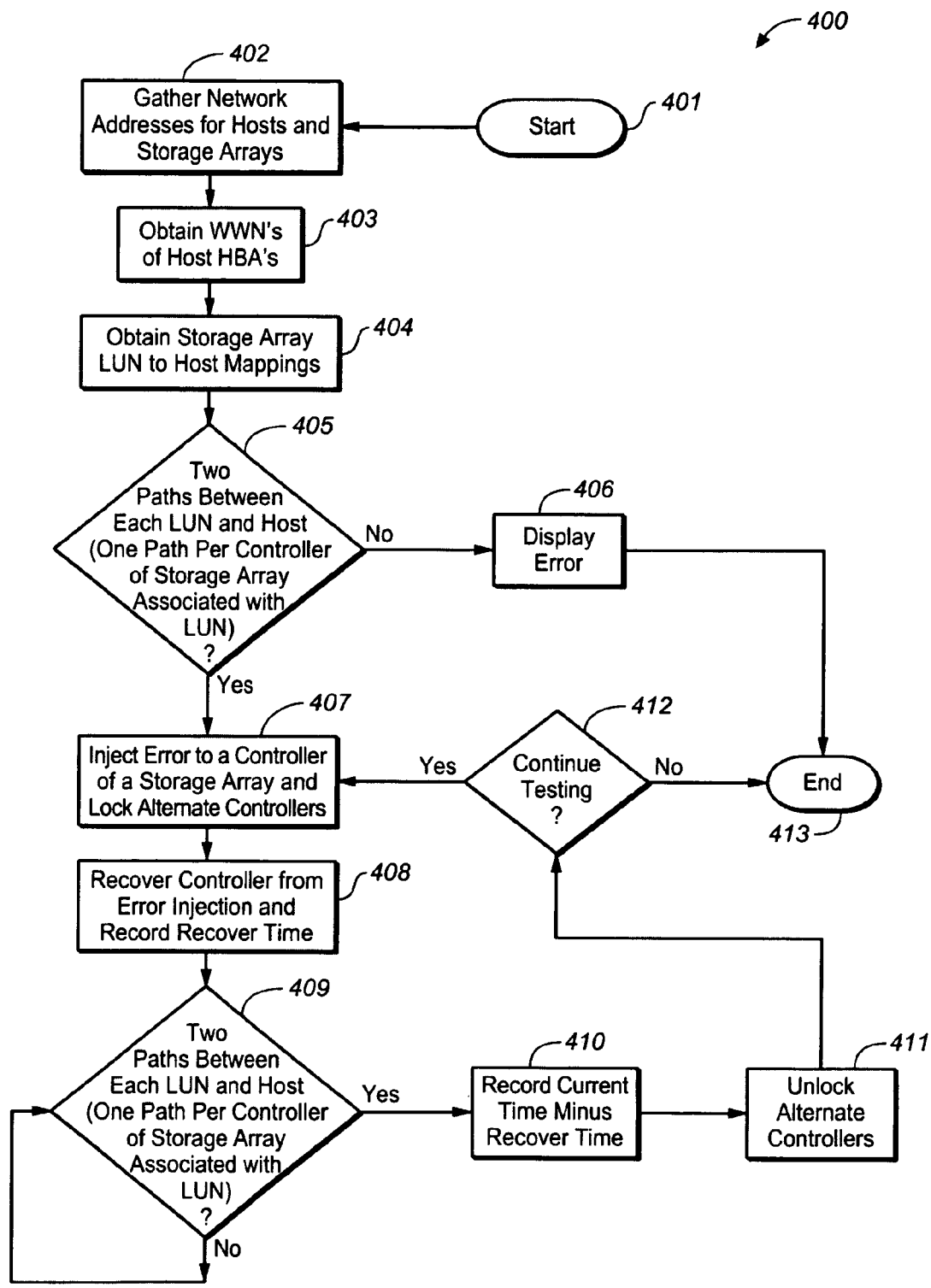
FIG. 4 is a flowchart of a test method, in accordance with an alternative embodiment of the present invention.

FIG. 4 illustrates a flowchart of a test method 400, in accordance with an alternative embodiment of the present disclosure, which may be utilized with a storage system such as storage system 100. From a start 401, network addresses for hosts and storage arrays are gathered 402. WWNs of host HBAs are obtained 403. Storage array LUN to host mappings are obtained 404. A determination 405 is made as to whether 2 paths exist between each LUN and host (at least one path per controller of the storage array associated with each LUN). If 2 paths do not exist between each LUN and host (at least one path per controller of the storage array associated with each LUN), an error is displayed 406 and the test proceeds to an end 413. The error may be displayed on an output device (including, but not limited to a CRT, a LCD, and a printer) (not shown) and/or recorded in storage device (including, but not limited to, a main memory, a cache memory, a hard disk, and a flash memory). If 2 paths exist between each LUN and host (at least one path per controller of the storage array associated with each LUN), an error is injected to a controller of a storage array and alternate controllers of the storage array are locked 407. Locking the controller of the storage array may not affect the operation of the controller, but rather may prevent an error from being injected while locked. Locking of the controller may occur outside the knowledge and operation of the storage array. Then, the controller is recovered from the injected error and a recover time is recorded 408. A determination 409 is made as to whether 2 paths exist between each LUN and host (at least one path per controller of the storage array associated with each LUN). If 2 paths do not exist between each LUN and host (at least one path per controller of the storage array associated with each LUN), a determination 409 is again made as to whether 2 paths exist between each LUN and host (at least one path per controller of the storage array associated with each LUN). If 2 paths exist between each LUN and host (at least one path per controller of the storage array associated with each LUN), a current time minus the recover time is recorded 410. The current time minus the recover time may indicate the time necessary for the enumeration process to complete on a host when a path to a storage array controller is restored and may be utilized to optimize the enumeration process handling software. The alternate controllers of the storage array are unlocked 411. A determination 412 is made as to whether to continue testing. If testing is to continue, an error is injected to a controller of a storage array and alternate controllers of the storage array are locked 407. Locking the controller of the storage array may not affect the operation of the controller, but rather may prevent an error from being injected while locked. Locking of the controller may occur outside the knowledge and operation of the storage array. If testing is not to continue, the test proceeds to an end 413.

Figure 5:
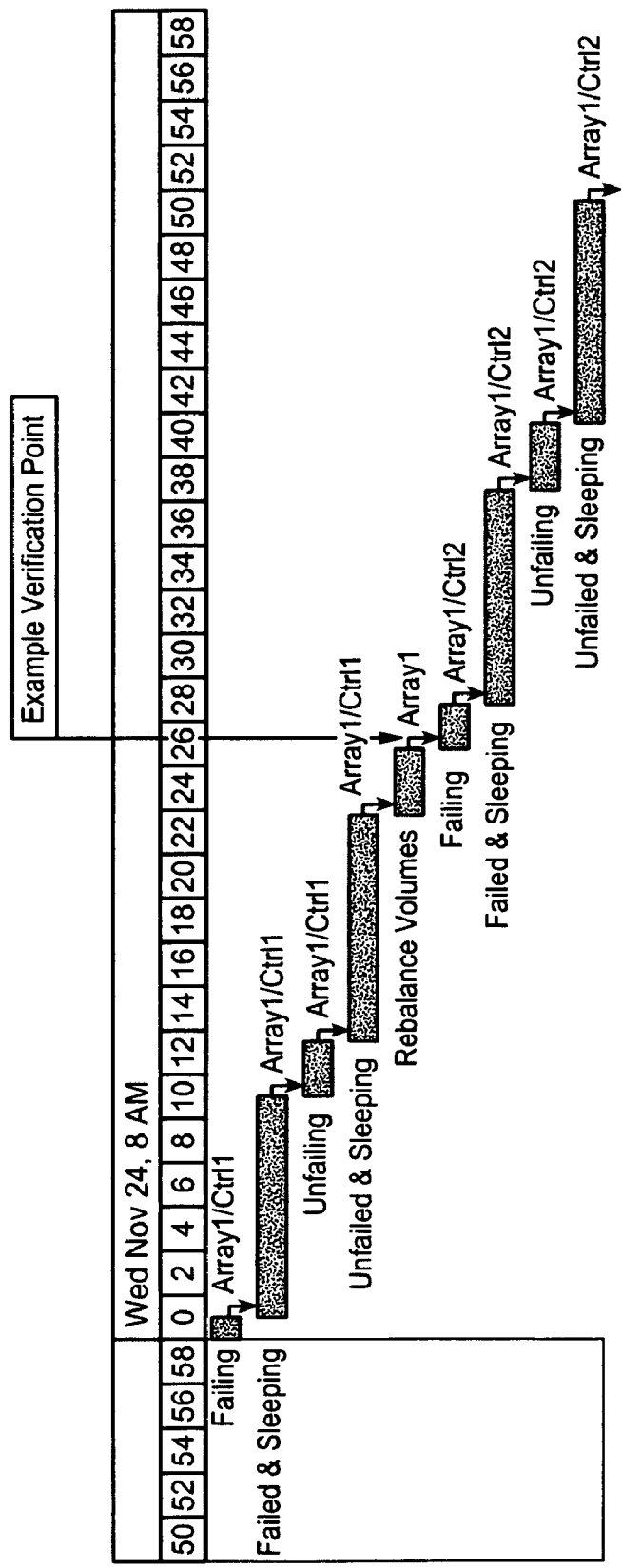
FIG. 5 is a diagram illustrating a sample test sequence, in accordance with an exemplary embodiment of the present invention.
Figure 6:
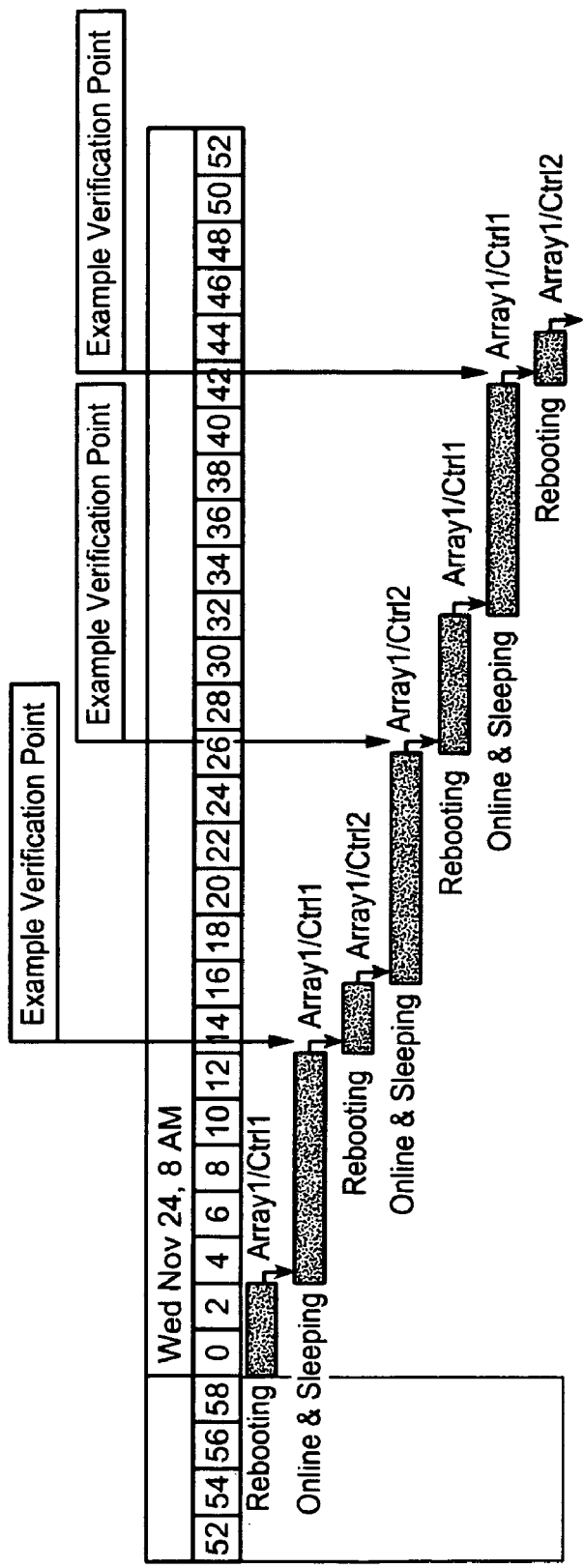
FIG. 6 is a diagram illustrating a sample test sequence, in accordance with an exemplary embodiment of the present invention.

FIGS. 5 and 6 illustrate example test sequences of a storage array (Array1) including two storage array controllers (Ctrl1 and Ctrl2). The state of the controllers are shown at various times during the test sequences and example points during the test sequences where the test may pause to determine 2 paths exist between each LUN and host before proceeding are illustrated.

Referring again to FIG. 1, the test may comprise computer executable instructions embodied in a tangible media. The computer executable instructions may be tangibly embodied in a storage device 108 of host 101 including, but not limited to, a main memory, a hard drive, a CD, a DVD, a cache memory, and/or a flash memory. The computer executable instructions may be executed by host 101. Alternatively, the computer executable instructions may be embodied in a storage device 110 of a test computing device 109 including, but not limited to, a main memory, a hard drive, a CD, a DVD, a cache memory, and/or a flash memory. The test computing device 109 may be communicably connected to host 101 and/or storage array 107 and may execute the computer executable instructions.

Figure 9:
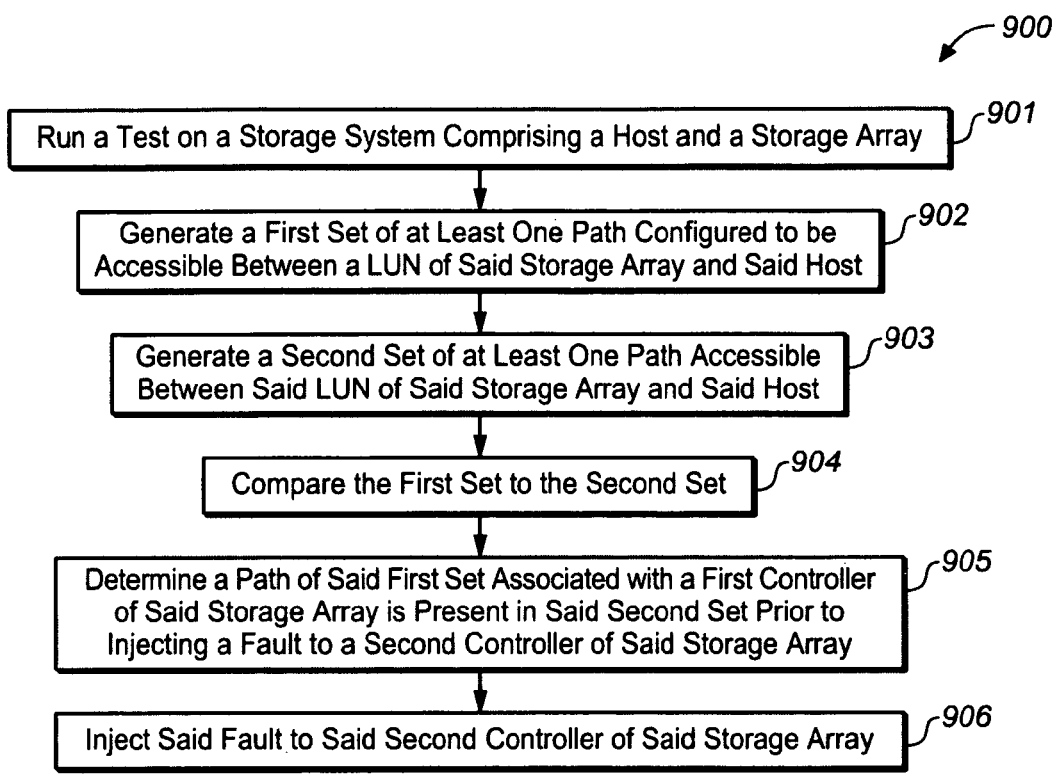
FIG. 9 is a flow chart of a method for performing a test on a storage system, in accordance with an alternative embodiment of the present invention.

Referring now to FIG. 9, a method 900 for performing a test on a storage system, in accordance with an exemplary embodiment of the present invention, is illustrated. In step 901, run a test on a storage system comprising a host and a storage array. In step 902, generate a first set of at least one path configured to be accessible between a LUN of said storage array and said host. Generating a first set of at least one path configured to be accessible between a LUN of said storage array and said host may comprise querying said storage array to determine a WWN of said storage array, a WWN for each LUN of said storage array, and a WWN of a HBA associated with each one of said each LUN of said storage array. Querying said storage array may utilize a RPC API of said storage array. Generating a first set of at least one path configured to be accessible between a LUN of said storage array and said host may comprise querying said host to determine a network address of said host associated with said WWN of said HBA. Generating a first set of at least one path configured to be accessible between a LUN of said storage array and said host may comprise obtaining a WWN of said storage array from a first input to said test and obtaining a network address of said host associate with said WWN of said HBA from a second input to said test. In step 903, generate a second set of at least one path accessible between said LUN of said storage array and said host. Generating a second set of at least one path accessible between said LUN of said storage array and said host may comprise querying a failover driver of said host. In step 904, compare the first set to the second set. In step 905, determine a path of said first set associated with a first controller of said storage array is present in said second set prior to injecting a fault to a second controller of said storage array. Determining a path of said first set associated with a first controller of said storage array is present in said second set prior to injecting a fault to a second controller of said storage array may comprise locking said second controller where said fault cannot be injected to said second controller while locked, determining a path of said first set associated with said first controller of said storage array is present in said second set, and unlocking said second controller. Locking said second controller may not affect the operation of said second controller, but rather may prevent an error from being injected while locked. Locking of said second controller may occur outside the knowledge and operation of the storage array. Locking said second controller may be performed utilizing a semaphore associated with said second controller. In step 906, inject said fault to said second controller of said storage array.

Figure 10:
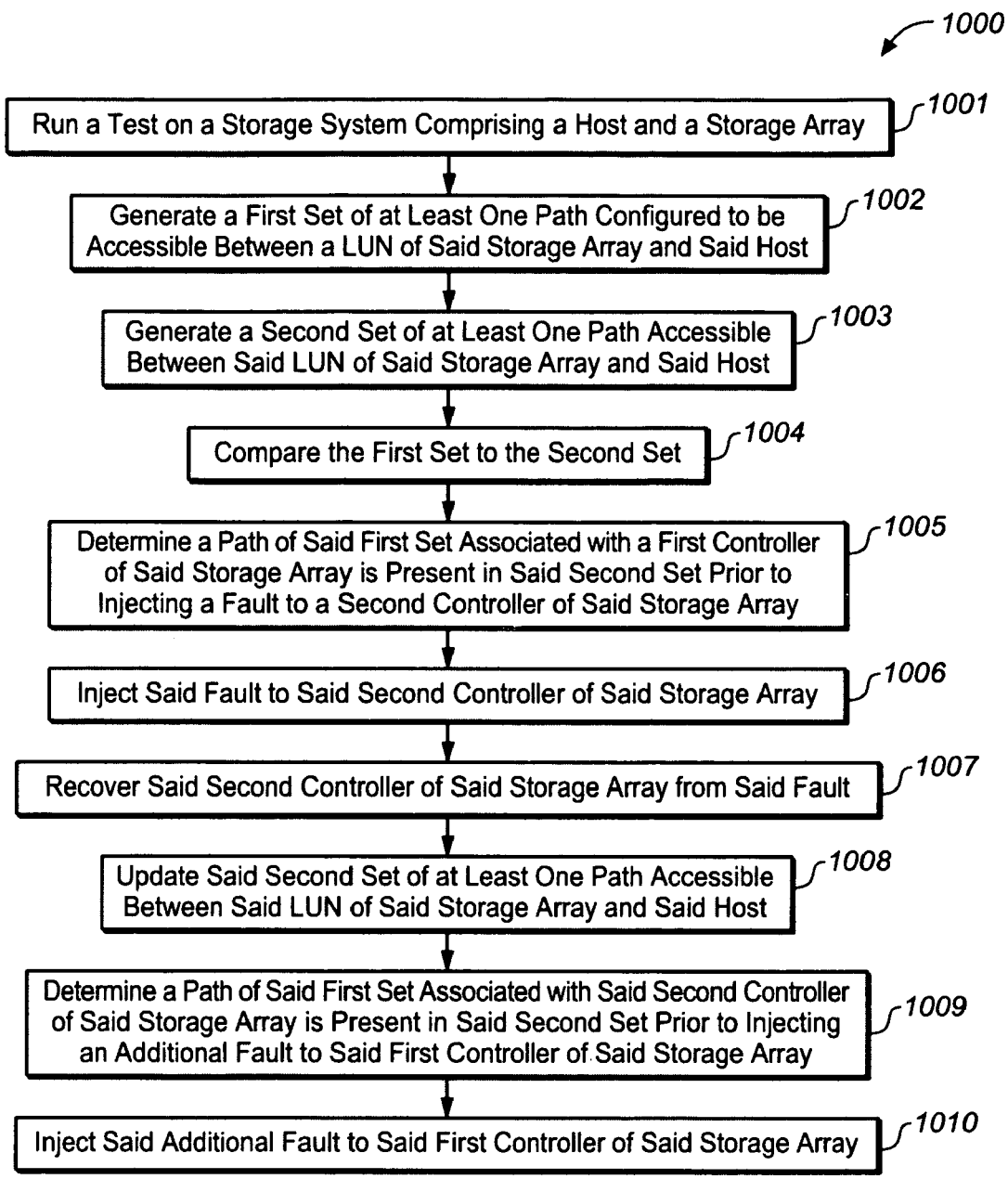
FIG. 10 is a flow chart of a method for performing a test on a storage system, in accordance with an alternative embodiment of the present invention.

Referring now to FIG. 10, a method 1000 for performing a test on a storage system, in accordance with an alternative embodiment of the present invention, is illustrated. In step 1001, run a test on a storage system comprising a host and a storage array. In step 1002, generate a first set of at least one path configured to be accessible between a LUN of said storage array and said host. Generating a first set of at least one path configured to be accessible between a LUN of said storage array and said host may comprise querying said storage array to determine a WWN of said storage array, a WWN for each LUN of said storage array, and a WWN of a HBA associated with each one of said each LUN of said storage array. Querying said storage array may utilize a RPC API of said storage array. Generating a first set of at least one path configured to be accessible between a LUN of said storage array and said host may comprise querying said host to determine a network address of said host associated with said WWN of said HBA. Generating a first set of at least one path configured to be accessible between a LUN of said storage array and said host may comprise obtaining a WWN of said storage array from a first input to said test and obtaining a network address of said host associate with said WWN of said HBA from a second input to said test. In step 1003, generate a second set of at least one path accessible between said LUN of said storage array and said host. Generating a second set of at least one path accessible between said LUN of said storage array and said host may comprise querying a failover driver of said host. In step 1004, compare the first set to the second set. In step 1005, determine a path of said first set associated with a first controller of said storage array is present in said second set prior to injecting a fault to a second controller of said storage array. Determining a path of said first set associated with a first controller of said storage array is present in said second set prior to injecting a fault to a second controller of said storage array may comprise locking said second controller where said fault cannot be injected to said second controller while locked, determining a path of said first set associated with said first controller of said storage array is present in said second set, and unlocking said second controller. Locking said second controller may not affect the operation of said second controller, but rather may prevent an error from being injected while locked. Locking of said second controller may occur outside the knowledge and operation of the storage array. Locking said second controller may be performed utilizing a semaphore associated with said second controller. In step 1006, inject said fault to said second controller of said storage array. In step 1007, recover said second controller of said storage array from said fault. In step 1008, update said second set of at least one path accessible between said LUN of said storage array and said host. In step 1009, determine a path of said first set associated with said second controller of said storage array is present in said second set prior to injecting an additional fault to said first controller of said storage array. Determining a path of said first set associated with said second controller of said storage array is present in said second set prior to injecting a fault to said first controller of said storage array may comprise locking said first controller where said fault cannot be injected to said first controller while locked, determining a path of said first set associated with said second controller of said storage array is present in said second set, and unlocking said first controller. Locking said first controller may not affect the operation of said first controller, but rather may prevent an error from being injected while locked. Locking of said first controller may occur outside the knowledge and operation of the storage array. Locking said first controller may be performed utilizing a semaphore associated with said first controller. In step 1010, inject said additional fault to said first controller of said storage array.

Figure 11:
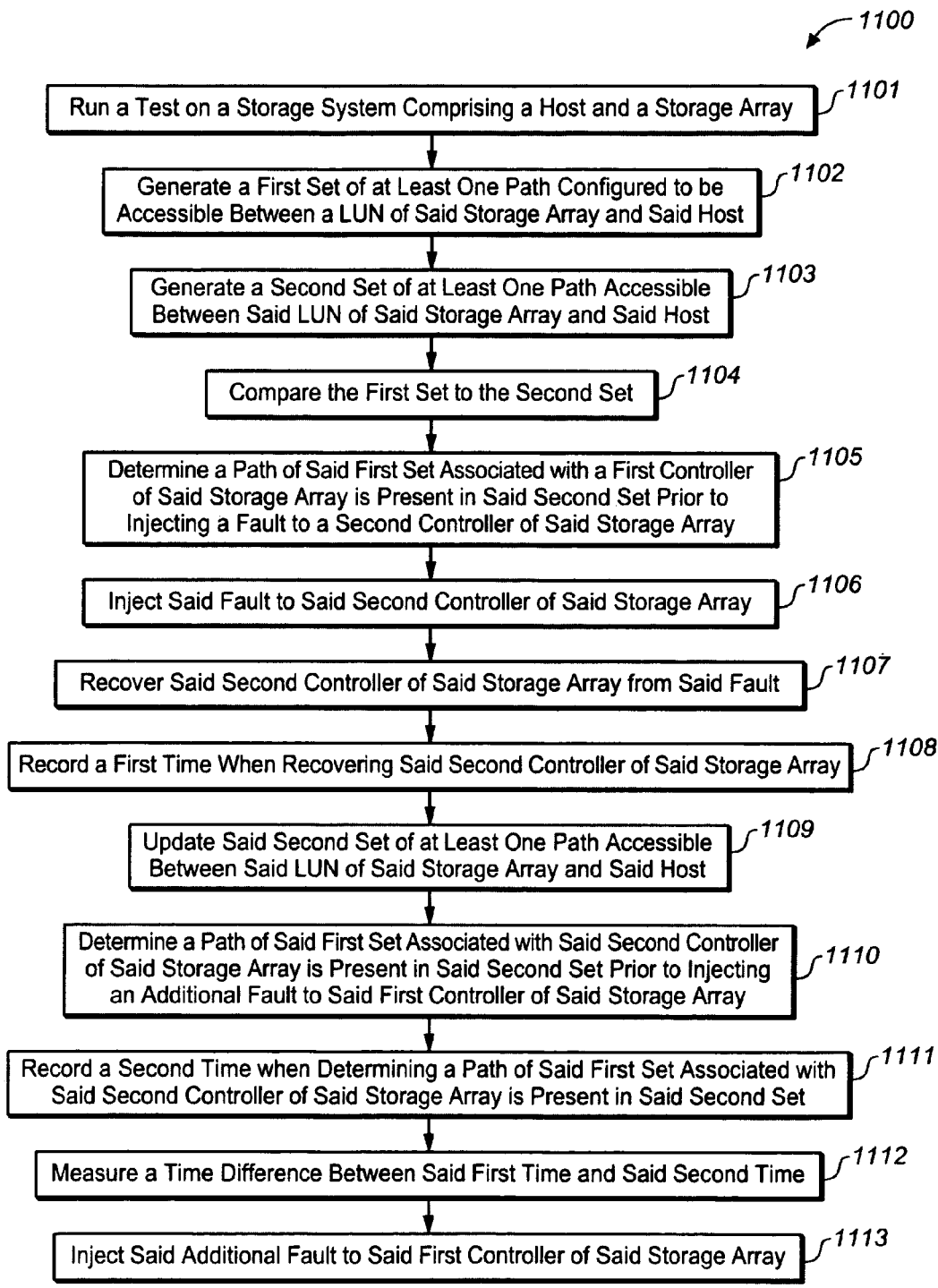
FIG. 11 is a flow chart of a method for performing a test on a storage system, in accordance with an alternative embodiment of the present invention.

Referring now to FIG. 11, a method 1100 for performing a test on a storage system, in accordance with an alternative embodiment of the present invention, is illustrated. In step 1101, run a test on a storage system comprising a host and a storage array. In step 1102, generate a first set of at least one path configured to be accessible between a LUN of said storage array and said host. Generating a first set of at least one path configured to be accessible between a LUN of said storage array and said host may comprise querying said storage array to determine a WWN of said storage array, a WWN for each LUN of said storage array, and a WWN of a HBA associated with each one of said each LUN of said storage array. Querying said storage array may utilize a RPC API of said storage array. Generating a first set of at least one path configured to be accessible between a LUN of said storage array and said host may comprise querying said host to determine a network address of said host associated with said WWN of said HBA. Generating a first set of at least one path configured to be accessible between a LUN of said storage array and said host may comprise obtaining a WWN of said storage array from a first input to said test and obtaining a network address of said host associate with said WWN of said HBA from a second input to said test. In step 1103, generate a second set of at least one path accessible between said LUN of said storage array and said host. Generating a second set of at least one path accessible between said LUN of said storage array and said host may comprise querying a failover driver of said host. In step 1104, compare the first set to the second set. In step 1105, determine a path of said first set associated with a first controller of said storage array is present in said second set prior to injecting a fault to a second controller of said storage array. Determining a path of said first set associated with a first controller of said storage array is present in said second set prior to injecting a fault to a second controller of said storage array may comprise locking said second controller where said fault cannot be injected to said second controller while locked, determining a path of said first set associated with said first controller of said storage array is present in said second set, and unlocking said second controller. Locking said second controller may not affect the operation of said second controller, but rather may prevent an error from being injected while locked. Locking of said second controller may occur outside the knowledge and operation of the storage array. Locking said second controller may be performed utilizing a semaphore associated with said second controller. In step 1106, inject said fault to said second controller of said storage array. In step 1107, recover said second controller of said storage array from said fault. In step 1108, record a first time when recovering said second controller of said storage array. In step 1109, update said second set of at least one path accessible between said LUN of said storage array and said host. In step 1110, determine a path of said first set associated with said second controller of said storage array is present in said second set prior to injecting an additional fault to said first controller of said storage array. Determining a path of said first set associated with said second controller of said storage array is present in said second set prior to injecting a fault to said first controller of said storage array may comprise locking said first controller where said fault cannot be injected to said first controller while locked, determining a path of said first set associated with said second controller of said storage array is present in said second set, and unlocking said first controller. Locking said first controller may not affect the operation of said first controller, but rather may prevent an error from being injected while locked. Locking of said first controller may occur outside the knowledge and operation of the storage array. Locking said first controller may be performed utilizing a semaphore associated with said first controller. In step 1110, record a second time when determining a path of said first set associated with said second controller of said storage array is present in said second set. In step 1112, measure a time difference between said first time and said second time. The time difference may be recorded. In step 1113, inject said additional fault to said first controller of said storage array.

Missing paths between LUNs and the associated storage array 107 may also occur if the storage system 100, host 101, and/or switch 103 coupling storage system 107 and host 101 together are not configured properly. It may be difficult for the user of storage system 100 to become aware that paths are missing between host 101 and storage array 107. Improper configuration may result in unintended lack of availability of data or lack of redundancy in the path to the data. For example, if HBA 102, switch 103 and/or storage controller A 104 and storage controller B 105 were improperly configured, volume 106 would not be available to host 101. By way of another example, if either storage controller A 104 or storage controller B 105 were improperly configured, there would be a lack of redundancy in the path between host 101 and volume 106.

In an alternative embodiment of the present disclosure, the configuration of storage system 100 may be verified. The configuration verification may verify that the storage array controller LUNs which are configured to be accessible by host 101 are actually accessible by host 101. The storage array controller LUNs which are configured to be accessible by host 101 may be automatically discovered. World Wide Names (WWN) (a unique identifier on a storage network) may be used between HBA 102, the LUN mapping to volume 106, storage array controller A 104, and storage array controller 105 as the unique identifier to discover this relationship by querying mapping data structures of storage array 107 and HBA 102 of host 101. A failover driver of host 101 may be queried one or more times during testing to determine which LUNs are currently accessible by host 101 as associated with storage controller A 104 and/or storage controller B 105. The configuration verification may compare the storage array controller LUNs which are configured to be accessible by host 101 with the LUNs which are currently accessible by host 101 as associated with storage controller A 104 and/or storage controller 105 to verify the configuration of storage system 100. If the configuration verification is unable to verify the configuration of storage system 100, the configuration verification may display an error. The error may be displayed on an output device (including, but not limited to a CRT, a LCD, and a printer) (not shown) of host 101 and/or test computing device 109. The error may be recorded to storage device 108 of host 101 and/or storage device 110 of test computing device 109.

The configuration verification may comprise computer executable instructions embodied in a tangible media. The computer executable instructions may be tangibly embodied in a storage device 108 of host 101 including, but not limited to, a main memory, a hard drive, a CD, a DVD, a cache memory, and/or a flash memory. The computer executable instructions may be executed by host 101. Alternatively, the computer executable instructions may be embodied in a storage device 110 of a test computing device 109 including, but not limited to, a main memory, a hard drive, a CD, a DVD, a cache memory, and/or a flash memory. The test computing device 109 may be communicably connected to host 101 and/or storage array 107 and may execute the computer executable instructions.

Figure 7:
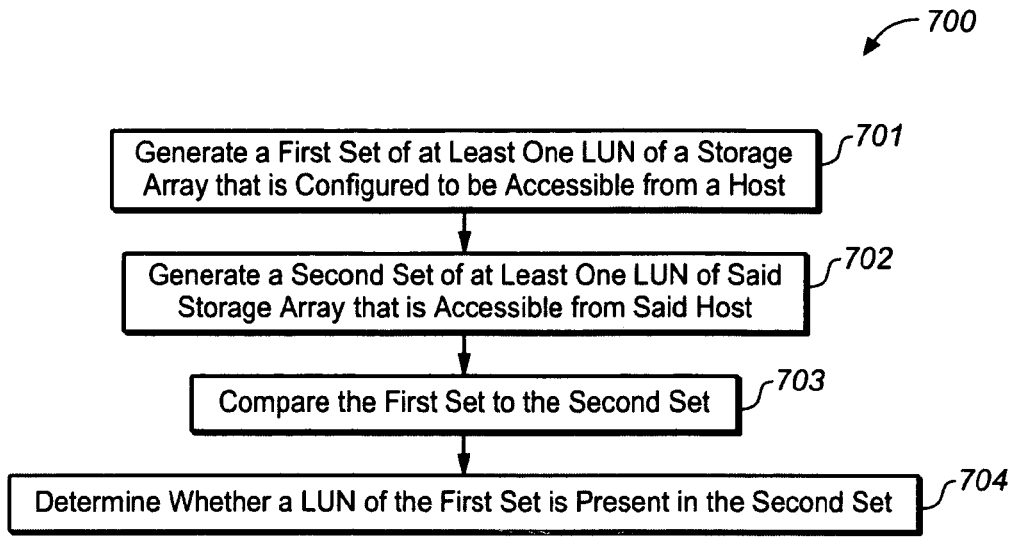
FIG. 7 is a flow chart of a method for verifying the configuration of a storage array, in accordance with an alternative embodiment of the present invention.

Referring now to FIG. 7, a method 700 for verifying the configuration of a storage system, in accordance with an exemplary embodiment of the present invention, is illustrated. In step 701, generate a first set of at least one path configured to be accessible between a LUN of said storage array and said host. Generating a first set of at least one path configured to be accessible between a LUN of said storage array and said host may comprise querying said storage array to determine a WWN of said storage array, a WWN for each LUN of said storage array, and a WWN of a HBA associated with each one of said each LUN of said storage array. Querying said storage array may utilize a RPC API of said storage array. Generating a first set of at least one path configured to be accessible between a LUN of said storage array and said host may comprise querying said host to determine a network address of said host associated with said WWN of said HBA. Generating a first set of at least one path configured to be accessible between a LUN of said storage array and said host may comprise obtaining a WWN of said storage array from a first input to said test and obtaining a network address of said host associate with said WWN of said HBA from a second input to said test. In step 702, generate a second set of at least one path accessible between said LUN of said storage array and said host. Generating a second set of at least one path accessible between said LUN of said storage array and said host may comprise querying a failover driver of said host. In step 703, compare the first set to the second set. In step 704, determine a path of said first set associated with a first controller of said storage array is present in said second set.

Figure 8:
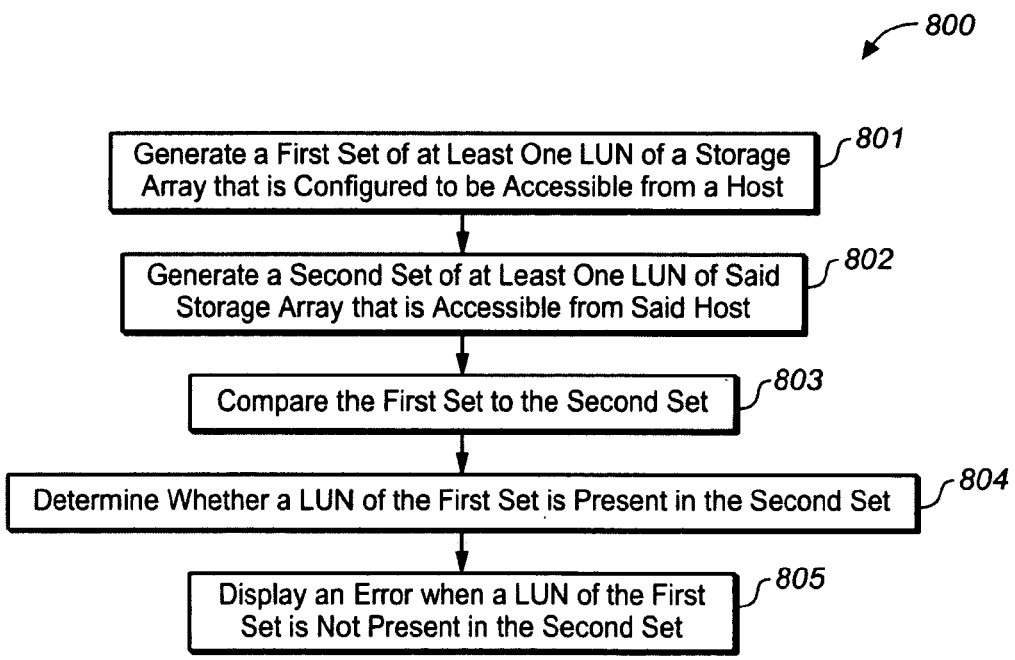
FIG. 8 is a flow chart of a method for verifying the configuration of a storage array, in accordance with an alternative embodiment of the present invention.

Referring now to FIG. 8, a method 800 for verifying the configuration of a storage system, in accordance with an alternative embodiment of the present invention, is illustrated. In step 801, generate a first set of at least one path configured to be accessible between a LUN of said storage array and said host. Generating a first set of at least one path configured to be accessible between a LUN of said storage array and said host may comprise querying said storage array to determine a WWN of said storage array, a WWN for each LUN of said storage array, and a WWN of a HBA associated with each one of said each LUN of said storage array. Querying said storage array may utilize a RPC API of said storage array. Generating a first set of at least one path configured to be accessible between a LUN of said storage array and said host may comprise querying said host to determine a network address of said host associated with said WWN of said HBA. Generating a first set of at least one path configured to be accessible between a LUN of said storage array and said host may comprise obtaining a WWN of said storage array from a first input to said test and obtaining a network address of said host associate with said WWN of said HBA from a second input to said test. In step 802, generate a second set of at least one path accessible between said LUN of said storage array and said host. Generating a second set of at least one path accessible between said LUN of said storage array and said host may comprise querying a failover driver of said host. In step 803, compare the first set to the second set. In step 804, determine a path of said first set associated with a first controller of said storage array is present in said second set. In step 805, display an error when a LUN of the first set is not present in the second set. The error may be displayed on an output device (including, but not limited to a CRT, a LCD, and a printer) (not shown) and/or recorded in storage device (including, but not limited to, a main memory, a cache memory, a hard disk, and a flash memory).

The present disclosure provides testing of a storage system that may prevent a zero path scenario from occurring. The storage array controller LUNs which may be configured to be accessible by one or more hosts may be automatically discovered. The test may compare the storage array controller LUNs which may be configured to be accessible by one or more hosts with the LUNs which are currently available to one or more host as associated with storage controllers of a storage array to prevent a zero path scenario from occurring. The test may also track and record the time it takes for the enumeration process to complete when a path between a host and a storage array is restored. This time may be utilized to optimize the enumeration process handling software. The present disclosure also provides verification of the configuration of a storage system. The configuration verification may verify that the storage array controller LUNs which are configured to be accessible by a host are actually accessible by the host. The storage array controller LUNs which are configured to be accessible by a host may be automatically discovered. The configuration verification may compare the storage array controller LUNs which are configured to be accessible by a host with the LUNs which are currently accessible by the host as associated with storage controllers of a storage array to verify the configuration of storage system. If the configuration verification is unable to verify the configuration of the storage system, the configuration verification may display an error.

It is understood that the specific order or hierarchy of steps in the processes disclosed is an example of exemplary approaches. Based upon design preferences, it is understood that the specific order or hierarchy of steps in the processes may be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A method, comprising:
 running a test on a storage system comprising a host and a storage array;
 generating a first set of at least one path configured to be accessible between a LUN (logical unit number) of said storage array and said host;
 generating a second set of at least one path accessible between said LUN of said storage array and said host;
 comparing the first set to the second set;
 determining a path of said first set associated with a first controller of said storage array is present in said second set prior to injecting a fault to a second controller of said storage array;
 injecting said fault to said second controller of said storage array;
 recovering said second controller of said storage array from said fault;
 updating said second set of at least one path accessible between said LUN of said storage array and said host;
 determining a path of said first set associated with said second controller of said storage array is present in said second set prior to injecting an additional fault to said first controller of said storage array;
 injecting said additional fault to said first controller of said storage array;
 recording a first time when recovering said second controller of said storage array;
 recording a second time when determining a path of said first set associated with said second controller of said storage array is present in said second set;
 measuring a time difference between said first time and said second time; and
 optimizing the test based upon the measured time difference.

2. The method as claimed in claim 1, wherein said generating a first set of at least one path configured to be accessible between a LUN (logical unit number) of said storage array and said host comprises:
 querying said storage array to determine a WWN (world wide name) of said storage array, a WWN for each LUN of said storage array, and a WWN of a HBA (host bus adapter) associated with each one of said each LUN of said storage array; and
 querying said host to determine a network address of said host associated with said WWN of said HBA.

3. The method as claimed in claim 2, wherein said querying said storage array comprises:
 querying said storage array utilizing a remote procedure call (RPC) application programming interface (API).

4. The method as claimed in claim 1, wherein said generating a first set of at least one path configured to be accessible between a LUN (logical unit number) of said storage array and said host comprises:
 obtaining a WWN (world wide name) of said storage array from a first input to said test; and
 obtaining a network address of said host associated with said WWN of said HBA from a second input to said test.

5. The method as claimed in claim 1, wherein said generating a second set of at least one path accessible between said LUN of said storage array and said host comprises:
 querying a failover driver of said host to generate said second set of at least one path accessible between said LUN of said storage array and said host.

6. The method of claim 1, wherein said determining a path of said first set associated with a first controller of said storage array is present in said second set prior to injecting a fault to a second controller of said storage array comprises:
 locking said second controller wherein said fault cannot be injected to said second controller when said second controller is locked;
 determining a path of said first set associated with a first controller of said storage array is present in said second set; and
 unlocking said second controller.

7. The method of claim 6, wherein said second controller is locked utilizing a semaphore associated with said second controller.

8. The method of claim 1 wherein said determining a path of said first set associated with said second controller of said storage array is present in said second set prior to injecting an additional fault to said first controller of said storage array comprises:
 locking said first controller wherein said additional fault cannot be injected to said first controller when said first controller is locked;
 determining a path of said first set associated with a second controller of said storage array is present in said second set; and
 unlocking said first controller.

9. The method of claim 8, wherein said second controller is locked utilizing a semaphore associated with said second controller.

10. Computer executable instructions, embodied in a non-transitory media, for performing a method comprising:
 running a test on a storage system comprising a host and a storage array;
 generating a first set of at least one path configured to be accessible between a LUN (logical unit number) of said storage array and said host;
 generating a second set of at least one path accessible between said LUN of said storage array and said host;
 comparing the first set to the second set;
 determining a path of said first set associated with a first controller of said storage array is present in said second set prior to injecting a fault to a second controller of said storage array;
 injecting said fault to said second controller of said storage array;
 recovering said second controller of said storage array from said fault;
 updating said second set of at least one path accessible between said LUN of said storage array and said host;
 determining a path of said first set associated with said second controller of said storage array is present in said second set prior to injecting an additional fault to said first controller of said storage array;
 injecting said additional fault to said first controller of said storage array;
 recording a first time when recovering said second controller of said storage array;
 recording a second time when determining a path of said first set associated with said second controller of said storage array is present in said second set;
 measuring a time difference between said first time and said second time; and
 optimizing the test based upon the measured time difference.

* * * * *